US012438177B2

United States Patent
Tanaka et al.

(10) Patent No.: US 12,438,177 B2
(45) Date of Patent: Oct. 7, 2025

(54) FUEL CELL, ELECTROCHEMICAL DEVICE, AND METHOD OF TIGHTENING AND ADJUSTING FUEL CELL

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Takayuki Tanaka, Yokohama Kanagawa (JP); Isamu Kikuchi, Kawasaki Kanagawa (JP)

(73) Assignees: Kabushiki Kaisha Toshiba, Kawasaki (JP); Toshiba Energy Systems & Solutions Corporation, Kawasaki (JP)

( * ) Notice: Subject to any disclaimer, the term of this patent is extended or adjusted under 35 U.S.C. 154(b) by 577 days.

(21) Appl. No.: 17/893,120

(22) Filed: Aug. 22, 2022

(65) Prior Publication Data

US 2023/0054220 A1    Feb. 23, 2023

(30) Foreign Application Priority Data

Aug. 23, 2021   (JP) ................................ 2021-135899

(51) Int. Cl.
*H01M 8/248*      (2016.01)
*H01M 8/2404*      (2016.01)

(52) U.S. Cl.
CPC ......... *H01M 8/248* (2013.01); *H01M 8/2404* (2016.02)

(58) Field of Classification Search
CPC ............................. H01M 8/248; H01M 8/2404
(Continued)

(56) References Cited

U.S. PATENT DOCUMENTS

2006/0188771 A1*  8/2006 Allen ................... H01M 8/248
                                                             429/511
2018/0159150 A1*  6/2018 Kim ...................... H01M 8/241
(Continued)

FOREIGN PATENT DOCUMENTS

CA        2 642 286 A1    8/2006
CA        03178292       9/2022
(Continued)

OTHER PUBLICATIONS

Japan Patent Office, Office Action in JP App. No. 2021-135899, 2 pages, with machine translation, 5 pages (Dec. 17, 2024).
(Continued)

*Primary Examiner* — James M Erwin
(74) *Attorney, Agent, or Firm* — Finnegan, Henderson, Farabow, Garrett & Dunner, LLP (57) ABSTRACT

According to an embodiment, a fuel cell includes: a cell staked body 10 including a plurality of single unit fuel cells stacked one on another; a collecting plate 20 located on the cell stacked body 10 in a stacking direction; an insulating plate 30 located on the collecting plate 20; and a tightening structure 40 located on the insulating plate 30 and configured to hold the collecting plate 20 and the insulating plate 30 on the cell stacked body 10 by being tightened toward the cell stacked body 10. The tightening structure 40 includes a first tightening plate 41 including a planar portion in surface contact with the insulating plate 30, and a second tightening plate 42 located on the first tightening plate 41 and configured to press the first tightening plate 41 against the insulating plate 30 by being tightened toward the cell stacked body 10.

12 Claims, 4 Drawing Sheets (58) Field of Classification Search
USPC .......................................................... 429/470
See application file for complete search history.

(56) References Cited

U.S. PATENT DOCUMENTS

2019/0088974 A1\*   3/2019  Jensen ..................... H01M 8/12
2019/0341644 A1\*  11/2019  Carlstrom, Jr. ...... H01M 8/0254
2022/0166047 A1\*   5/2022  Naito .................. H01M 8/2404

FOREIGN PATENT DOCUMENTS

| JP | H10-270066 A | 10/1998 |
| JP | 2004-55297 A | 2/2004 |
| JP | 2009-199815 A | 9/2009 |
| JP | 5740214 B2 | 6/2015 |
| JP | A 2019-46539 A | 3/2019 |
| JP | A 2019-46540 A | 3/2019 |
| JP | A 2019-46542 A | 3/2019 |

OTHER PUBLICATIONS

State Intellectual Property Office of People's Republic of China, Office Action in CN App. No. 202210965426.5 (Apr. 10, 2025).
Canadian Intellectual Property Office, Office Action in CA App. No. 3,171,704 (Jun. 5, 2025).

\* cited by examiner

FUEL CELL, ELECTROCHEMICAL DEVICE, AND METHOD OF TIGHTENING AND ADJUSTING FUEL CELL

FIELD

Embodiments of the present invention relate to a fuel cell, an electrochemical device, and a method of tightening and adjusting a fuel cell.

CROSS REFERENCE TO RELATED APPLICATION

This application is based upon and claims the benefit of priority from Japanese Patent Application No. 2021-135899, filed on Aug. 23, 2021, the entire contents of which are incorporated herein by reference.

BACKGROUND

Electrochemical devices such as fuel batteries, electrolytic device, etc. are known. A fuel cell is a device that extracts electric energy from fuel by chemically reacting fuel, such as hydrogen, with an oxidant, such as aft.

An exemplary fuel cell comprises a cell stacked body including a plurality of single unit fuel cells stacked one on another, a pair of collecting plates, a pair of insulating plates, and a pair of tightening plates.

In a fuel cell of the above type, the pair of collecting plates, the pair of insulating plates, and the pair of tightening plates are located such that the cell stacked body is sandwiched therebetween. One of the pair of collecting plates, one of the pair of insulating plates, and one of the pair of tightening plates are located in this order on one end surface of the cell stacked body in a stacking direction thereof. The other collecting plate, the other insulating plate, and the other tightening plate are located in this order on the other end surface of the cell stacked body in the stacking direction. The pair of tightening plates are tightened by a fastening member which bridges them so as to come close to each other. Thereby, the respective members are integrated.

The aforementioned tightening plate usually has a plurality of protruding portions protruding to an outer peripheral side from the cell stacked body. Each protrusion has a fastening position. When the pair of tightening plates are tightened to come close to each other, the tightening plates are subjected to a tightening force at each fastening position. At this time, a center portion of the tightening plate, for example, is likely to float due to deflection caused by the tightening operation.

In a fuel cell using tightening plates, making uniform a surface pressure from a tightening plate to a cell stacked body is preferable, lest contact resistance between adjacent fuel cell cells increases. However, the aforementioned floating may disturb the uniformity in surface pressure.

A tightening plate including a structure of including a plurality of beams that are assembled to cross each other is known. Another known tightening plate has an integrally molded structure by means of a mold, from the viewpoint of simplification of components.

A tightening plate including a plurality of beams can suppress the aforementioned floating by setting an increased plate thickness and/or including a plurality of ribs so as to increase rigidity. However, its complicated shape and structure may increase costs.

On the other hand, in the case of the integrally molded structure, a plate thickness of the integrally molded tightening plate is usually restricted to about a few mm, from the viewpoint of processability (processing limit) of pressing and bending. Thus, it is difficult to ensure rigidity in the integrally molded tightening plate. For this reason, the integrally molded tightening plate sometimes has a projection projecting toward a cell stacked body at a position where floating tends to occur during the tightening operation, in order to make uniform a surface pressure to the cell stacked body.

However, in the tightening plate including such a projection, a surface pressure to an insulating plate varies between the projection and its surroundings. In this case, a distributed pressure may be applied to the tightening plate to the cell stacked body through a collecting plate and an insulating plate which generally have less rigid. Thus, there is a room to improve in uniformity in surface pressure in the tightening plate with the projection.

SUMMARY OF THE INVENTION

The objet of the embodiment described hereunder is to provide a fuel cell, an electrochemical device, and a method of tightening and adjusting a fuel cell, which can apply a uniform surface pressure from a tightening plate to a cell stacked body, even when the tightening plate is deflected.

DETAILED DESCRIPTION

In one embodiment, a fuel cell comprises: a cell staked body including a plurality of single unit fuel cells stacked one on another; a collecting plate located on the cell stacked body in a stacking direction of the single unit fuel cells; an insulating plate located on the collecting plate; and a tightening structure located on the insulating plate and configured to hold the collecting plate and the insulating plate on the cell stacked body by being tightened toward the cell stacked body. The tightening structure includes a first tightening plate including a planar portion in surface contact with the insulating plate, and a second tightening plate located on the first tightening plate and configured to press the first tightening plate against the insulating plate by being tightened toward the cell stacked body.

In one embodiment, an electrochemical device comprises: a cell stacked body including a plurality of electrochemical cells stacked one on another; a collecting plate located on the cell stacked body in a stacking direction of the electrochemical cells; an insulating plate located on the collecting plate; and a tightening structure located on the insulating plate and configured to hold the collecting plate and the insulating plate on the cell stacked body by being tightened toward the cell stacked body. The tightening structure includes a first tightening plate including a planar portion in surface contact with the insulating plate, and a second tightening plate located on the first tightening plate and configured to press the first tightening plate against the insulating plate by being tightened toward the cell stacked body.

In one embodiment, a method of tightening and adjusting a fuel cell is a method of tightening and adjusting a fuel cell comprising a cell staked body including a plurality of single unit fuel cells stacked one on another, a collecting plate located on the cell stacked body in a stacking direction of the single unit fuel cells; an insulating plate located on the collecting plate; and a tightening structure located on the insulating plate and configured to hold the collecting plate and the insulating plate on the cell stacked body by being tightened toward the cell stacked body. The method comprises: a step of detaching the tightening plate; a step of providing, on the insulating plate, an additional tightening plate including a planar portion in surface contact with the insulting plate; and a step of holding the collecting plate and the insulating plate on the cell stacked body by locating the tightening plate on the additional tightening plate, and by tightening the tightening plate toward the cell stacked body to press the additional tightening plate against the insulating plate.

A fuel cell 1, which is an example of an electrochemical device according to one embodiment, is described hereunder with reference to the attached drawings.

Overall Structure of Fuel Cell

Figure 1:
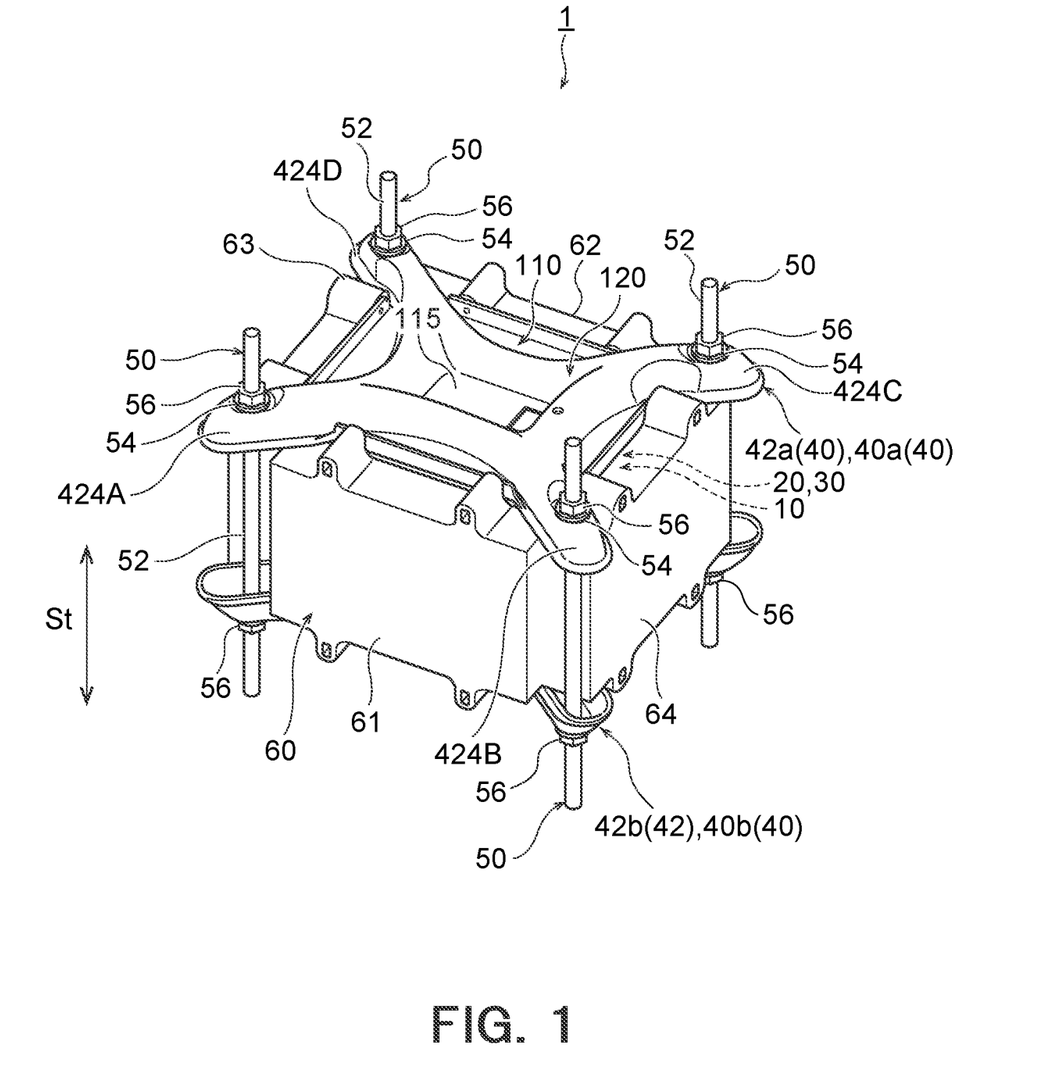
FIG. 1 is a perspective view of a fuel cell according to one embodiment.
Figure 2:
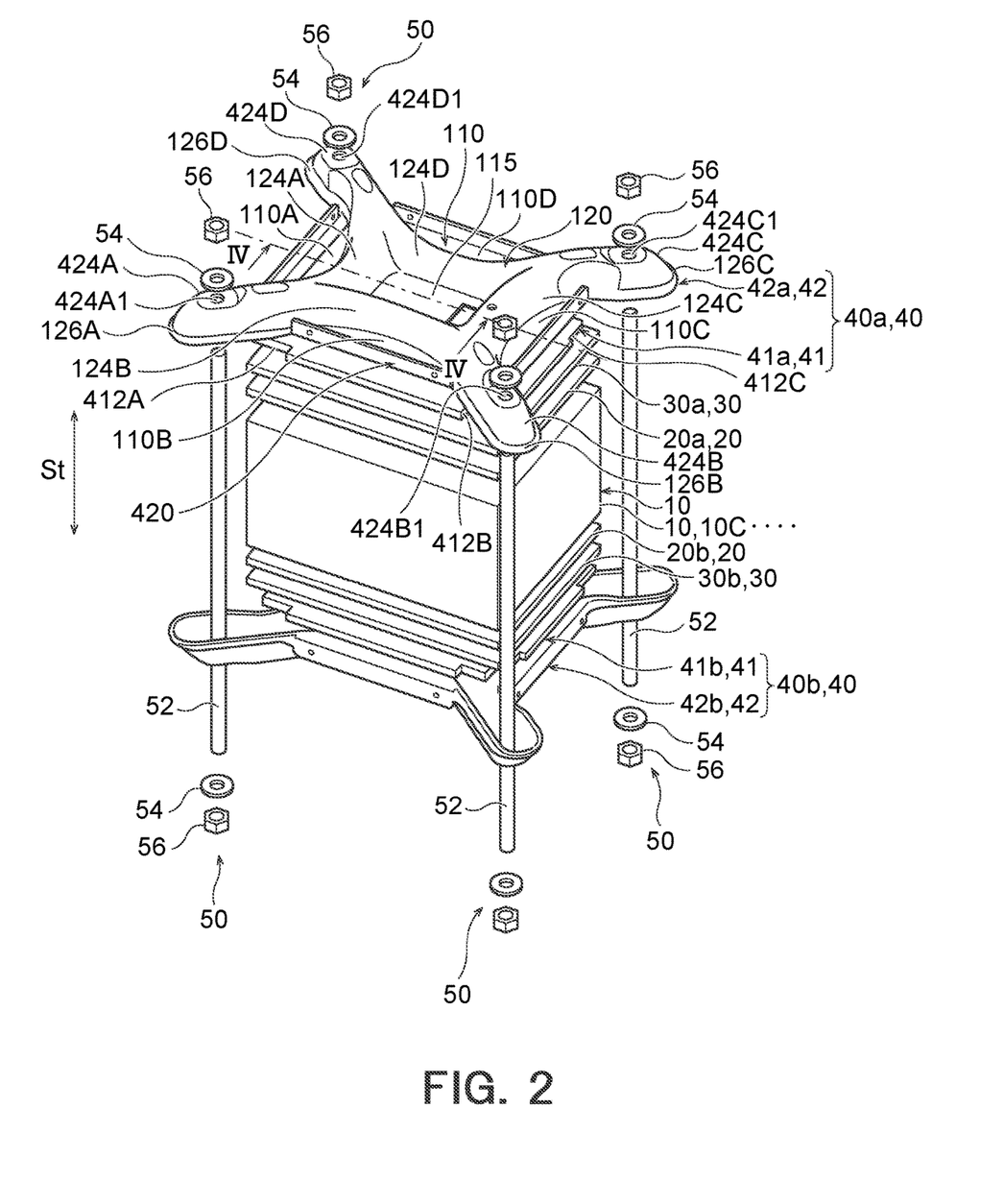
FIG. 2 is an exploded perspective view of the fuel cell shown in FIG. 1.

FIG. 1 is a perspective view of the fuel cell 1 according to one embodiment. FIG. 2 is an exploded perspective view of the fuel cell 1. The fuel cell 1 shown in FIGS. 1 and 2 is a device that generates electricity by an electrochemical reaction generated by single unit fuel cells 10c (see FIG. 2) included in a cell stacked body 10.

The fuel battery 1 comprises the cell stacked body 10, a pair of collecting plates 20, a pair of insulating plates 30, a pair of tightening structures 40, a fastening member 50, and a manifold unit 60.

As shown in FIG. 2, the cell stacked body 10 is formed by stacking a plurality of the single unit fuel cells 10c as electrochemical cells. The single unit fuel cells 10c generate electricity by an electrochemical reaction between a fuel gas containing hydrogen and air containing oxygen (oxidant). A reference numeral St in FIGS. 1 and 2 indicates a direction along which the single unit fuel cells 10c are stacked one on another (stacking direction hereunder).

The single unit fuel cell 10c includes, for example, a joint formed by sandwiching an electrolyte membrane between a fuel electrode and an oxidant electrode, and a separator forming a flow channel for supplying the joint with fuel and oxidant. The separator may be formed of an electrically conductive porous plate with micropores. The separator may be provided with a coolant flow channel. Although the illustrated cell stacked body 10 has a rectangular outer shape, it may have a cubic outer shape, an another hexahedral shape, or another three-dimensional shape.

The pair of collecting plates 20 comprise a first collecting plate 20a and a second collecting plate 20b. The first collecting plate 20a is located on an end surface of the cell stacked body 10 on one side (upper side in FIGS. 1 and 2) in the stacking direction St. The second collecting plate 20b is located on an end surface of the cell stacked body 10 on the other side (lower side in FIGS. 1 and 2) in the stacking direction St.

Each of the first collecting plate 20a and the second collecting plate 20b is a rectangular plate-shaped conductor which is a member for transmitting electric energy generated in the cell stacked body 10 to the outside, for example. The first collecting plate 20a and the second collecting plate 20b are formed to have a shape which is the same as or similar to the rectangular end surface of the cell stacked body 10. The first collecting plate 20a and the second collecting plate 20b are generally made of metal plate members, but any conductor can be used. The first collecting plate 20a and the second collecting plate 20b may be made of graphite plate members, for example.

The pair of insulating plates 30 comprise a first insulting plate 30a and a second insulating plate 30b. The first insulating plate 30a is located on the first collecting plate 20a in the stacking direction St. The second insulating plate 30b is located on the second collecting plate 20b in the stacking direction St. Each of the first insulating plate 30a and the second insulating plate 30b is a rectangular plate-shaped insulator which is made of a synthetic resin plate member, for example. In more detail, the first insulating plate 30a and the second insulating plate 30b are formed to have a rectangular shape which is the same as or similar to the first collecting plate 20a or the second collecting plate 20b facing them.

The pair of tightening structures 40 comprise a first tightening structure 40a and a second tightening structure 40b. The first tightening structure 40a is located on the first insulating plate 30a in the stacking direction St. The second tightening structure 40b is located on the second insulating plate 30b in the stacking direction St. Each of the first tightening structure 40a and the second tightening structure 40b includes a first tightening plate 41 and a second tightening plate 42. Hereunder, the first tightening plate 41 of the first tightening structure 40a is referred as the first tightening plate 41a, and the second tightening plate 42 of the first tightening structure 40a is referred as the second tightening plate 42a. The first tightening plate 41 of the second tightening structure 40b is referred as the first tightening plate 41b, and the second tightening plate 42 of the first second tightening structure 40b is referred as the second tightening plate 42b.

Each first tightening plate 41a, 41b is a plate-shaped member which is located between the corresponding insulating plate 30a, 30b and the corresponding second tightening plate 42a, 42b. In this embodiment, the first tightening plates 41a, 41b have the same shape as each other, and the second tightening plates 42a, 42b also have the same shape as each other. In the below description, the same reference numerals are assigned to the components of the first tightening plates 41a, 41b which are identical to each other, and the same reference numerals are also assigned to the components of the second tightening plates 42a, 42b which are identical to each other.

However, it is not necessary that the first tightening plates 41a, 41b have the same shape as each other, and that the second tightening plates 42a, 42b have the same shape as each other.

As shown in FIGS. 1 and 2, each second tightening plate 42a, 42b includes a plurality of fastening parts 424A, 424B, 424C, and 424D protruding to an outer peripheral side from the first tightening plate 41a, 41b. In more detail, the fastening parts 424A, 424B, 424C, and 424D also protrude to outer peripheral side from the cell stacked body 10, the collecting plates 20, the insulating plates 30 and the manifold unit 60. The expression "protrude to the outer peripheral side" herein means to protrude outside beyond a member, such as the first tightening plate 41a, 41b, for example, in a direction orthogonal to the stacking direction St.

As shown in FIG. 2, the fastening part 424A, 424B, 424C, 424D includes a through hole 424A1, 424B1, 424C1, 424D1 formed to pass therethrough in the stacking direction St. The fastening member 50 includes a plurality of fastening members 50 corresponding to the plurality of fastening parts 424A, 424B, 424C, and 424D. Each fastening member 50 bridges the fastening part 424A, 424B, 424C, 424D of the upper second tightening plate 42a in FIG. 2, and the fastening part fastening part 424A, 424B, 424C, 424D of the lower second tightening plate 42b in FIG. 2, and tightens the second tightening plate 42a and the second tightening plate 42b to come close to each other.

The fastening member 50 in this embodiment includes a stud bolt 52, a pair of washers 54, and a pair of nuts 56. One end of the stud bolt 52 is passed through the through hole 424A1, 424B, 424C1, 424D1 in the second tightening plate 42a, while the other end of the stud bolt 52 is passed through the through hole 424A1, 424B, 424C1, 424D1 of the second tightening plate 42b. The washer 54 and the nut 56 are attached to each of the one end and the other end of the stud bolt 52.

In the assembled state of the fastening member 50, when at least any of the nut 56 attached on the one end of the stud bolt 52 and the nut 56 attached to the other end of the stud bolt 52 is tightened toward the cell stacked body 10, the second tightening plate 42a, 42b is tightened toward the cell stacked body 10 by a force applied from the fastening part 424a, 424b, 424C, 424D in the stacking direction St. Thus, the collecting plates 20 and the insulating plates 30 are held on the cell staked body 10. Detailed structures of the first tightening plate 41a, 41b and the second tightening plate 42a, 42b are described later.

As shown in FIG. 1, the manifold unit 60 is located around the cell stacked body 10. The manifold unit 60 includes an oxidant electrode inlet manifold 61, an oxidant electrode outlet manifold 62, a fuel electrode inlet manifold 63, and a fuel electrode outlet manifold 64.

As described above, the single unit fuel cell 10c includes a joint formed by sandwiching an electrolyte membrane between a fuel electrode and an oxidant electrode, and a separator forming a flow channel for supplying the joint with fuel and oxidant. In this case, a fuel electrode flow channel is formed in one surface of the separator, and an oxidant electrode flow channel is formed in the other surface of the separator.

Figure 3:
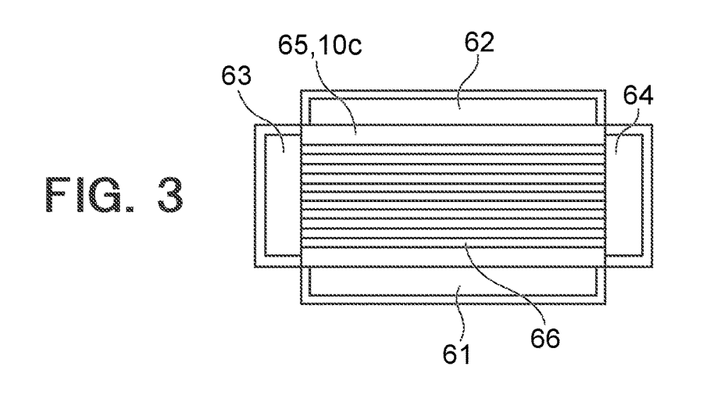
FIG. 3 is a schematic view for describing a flow channel structure in a cell stacked body of the fuel cell shown in FIG. 1.

FIG. 3 is a schematic view for describing a flow channel structure in the cell stacked body 10. FIG. 3 shows the respective manifolds 61 to 64, a separator 65 forming the single unit fuel cell 10c, and a fuel electrode flow channel 66 formed in the separator 65.

The fuel electrode inlet manifold 63 and the fuel electrode outlet manifold 64 are opposed to each other through the cell stacked body 10. The fuel electrode inlet manifold 63 and the fuel electrode outlet manifold 64 fluidically connect to the fuel electrode flow channel 66. Upon generation of electricity, fuel containing hydrogen (fuel gas) flows through a pipe, not shown, into the fuel electrode inlet manifold 63, and flows through the fuel electrode flow channel 66 to be discharged outside from the fuel electrode outlet manifold 64 though a pipe, not shown. An oxidant flows through a pipe, not shown, into the oxidant electrode inlet manifold 61, and flows through an oxidant electrode flow channel, not shown, in the separator to be discharged outside from the oxidant electrode outlet manifold 62 through a pipe, not shown.

Structure of Tightening Structure

The first tightening plates 41a, 41b and the second tightening plates 42a, 42b of the tightening structure 40 are described in detail below. In this embodiment, the first tightening plates 41a, 41b have the same shape as each other, and the second tightening plates 42a, 42b also have the same structure as each other. Thus, the first tightening plate 41a and the second tightening plate 42a are described, and description of the first tightening plate 41b and the second tightening plate 42b is omitted, for convenience of explanation.

First Tightening Plate

Figure 4:
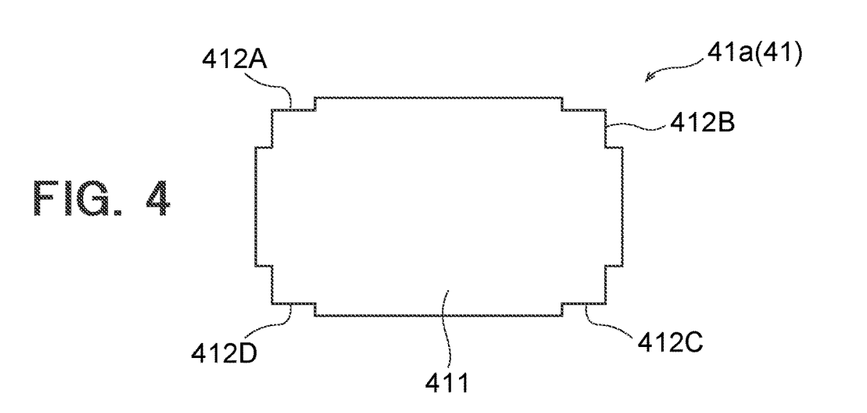
FIG. 4 is a view showing a first tightening plate of a tightening structure of the fuel cell shown in FIG. 1.

As described above, the first tightening plate 41a is a plate-shaped member, and is located between the corresponding first insulating plate 30a and the corresponding second tightening plate 42a. FIG. 4 is a view showing the first tightening plate 41a seen from a side on which the cell stacked body 10 is positioned. As shown in FIGS. 2 and 4, the first tightening panel 41a is a plate having a substantially rectangular shape, and includes a planar portion 411 to be in surface contact with the first insulating plate 30a.

In this embodiment, the first tightening plate 41a has a size that is included in the first insulating plate 30a, when the first tightening plate 41a is overlapped with the first insulting plate 30a facing it. Thus, in this embodiment, an entire main surface of the first tightening plate 41a on the side of the first collecting plate 20a provides the planar portion 411. In this embodiment, since the first tightening plate 41a is included in the first insulating plate 30a when overlapped together, the first tightening plate 41a is smaller than the first insulating plate 30a. Even in this case, the planar portion 411 is preferably in surface contact with 90% or more of the first insulating plate 30a including a center thereof. On the other hand, the planar portion 411 may be formed larger than the first insulating plate 30a and may be in surface contact with the first insulating plate 30a entirely.

The first tightening plate 41a is made of a member having a higher strength than the first insulating plate 30a. Specifically, flexural rigidity of the first insulating plate 41a is larger than flexural rigidity of the first insulating plate 30a. The first tightening plate 41a may be formed of a metal plate member or a resin plate member having high strength, but a material thereof is not specifically limited.

Cutouts 412A, 412B, 412C, and 412D are formed at four corners of the first tightening plate 41a. When seen in the stacking direction St, the aforementioned fastening parts 424A, 424B, 424C, and 424D of the second tightening plate 42a protrude to the outer peripheral side from the four corners of the first tightening plate 41a. On the other hand, the cutout 412A, 412B, 412C, 412D extends in a direction opposite to the protruding direction of the corresponding fastening part 424A, 424B, 424C, 424D.

These cutouts 412A, 412B, 412C, and 412D can mitigate a surface pressure when the fastening parts 424A, 424B, 424C, and 424D, which are deflected during the fastening operation, and the first tightening plate 41a are brought into contact with each other. In this embodiment, when the first tightening plate 41a is overlapped with the first insulating plate 30a facing it, the periphery of the first tightening plate 41a corresponds to the periphery of the first insulating plate 30a except the cutout portions.

In this embodiment, the cutout 412A, 412B, 412C, 412D is formed to have an L-shape, as shown in FIG. 4, but its shape is not specifically limited. The cutout 412A, 412B, 412C, 412D may have a rectangular shape, a chamfered shape, a centrally recessed arcuate shape, etc. Alternatively, the cutout 412A, 412B, 412C, 412D may not be formed.

Second Tightening Plate

Figure 5:
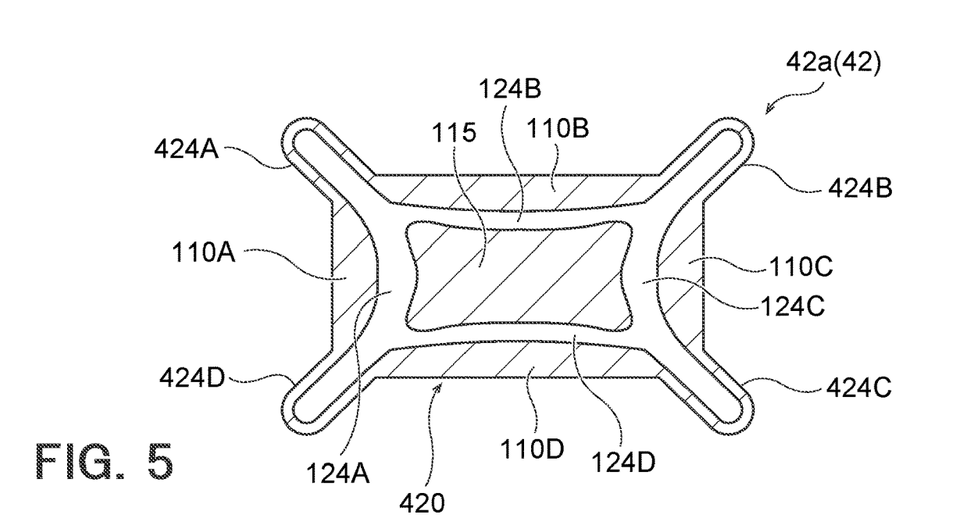
FIG. 5 is a view showing a second tightening plate of the tightening structure of the fuel cell shown in FIG. 1.

The second tightening plate 42a is located on the first tightening plate 41a and is configured to press the first tightening plate 41a against the first insulating plate 30a by being tightened toward the cell stacked body 10 by the aforementioned fastening parts 424A, 424B, 424C, and 424D. FIG. 5 is a view shown the second tightening plate 42a seen from the side on which the cell stacked body 10 is positioned.

Figure 6:
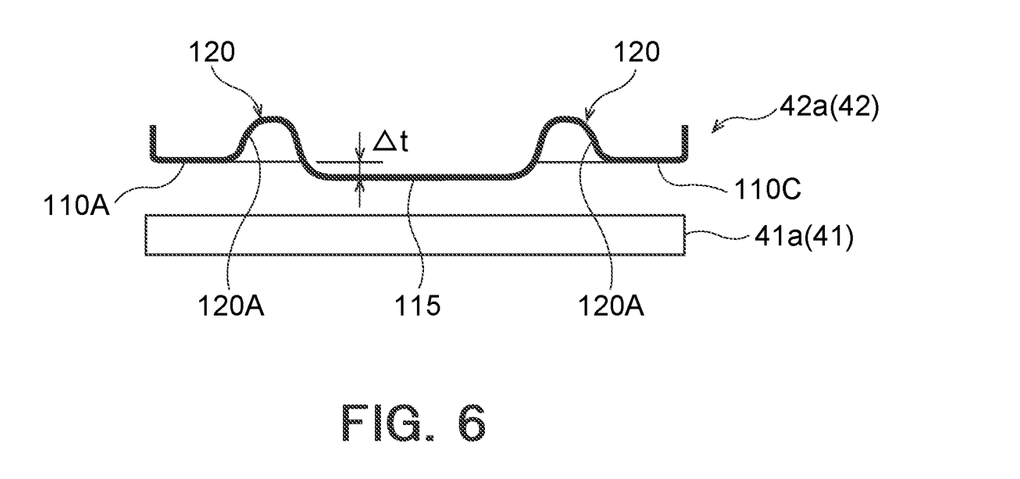
FIG. 6 is a sectional view of the second tightening plate shown in FIG. 5 before a tightening operation.
Figure 7:
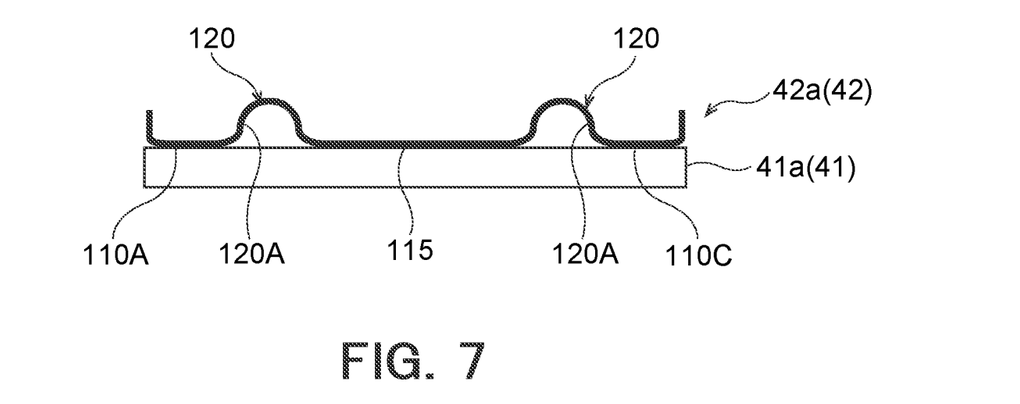
FIG. 7 is a sectional view of the second tightening plate shown in FIG. 5 after the tightening operation.

As shown in FIGS. 2 and 5, the second tightening plate 42a has a plate body 420 having a substantially rectangular shape in plan view, and the aforementioned fastening parts 424A, 424B, 424C, and 424D protruding from four corners of the plate body 420. The plate body 420 is a portion that is overlapped with the first tightening plate 41a during the tightening operation. FIG. 6 is a sectional view of the second tightening plate 42a before the tightening operation, which is a sectional view along a VI-VI line of FIG. 2. FIG. 7 is a sectional view corresponding to FIG. 6, showing the second tightening plate 42a after the tightening operation.

Referring FIGS. 6 and 7, the plate body 420 has not a planar shape but a corrugated shape. As shown in FIGS. 1 and 2, the plate body 420 has an outside pressing part 110 formed along an outer periphery, an inside pressing part 115 provided closer to a center than the outside pressing part 110, and a beam part 120 serving as a connection connecting the outside pressing part 110 and the inside pressing part 115. Since the beam part 120 is raised from the outside pressing part 110 and the inside pressing part 115, the corrugated shape is formed.

The outside pressing part 110 and the inside pressing part 115 are portions that come into contact with the first tightening plate 41a, when the second tightening plate 42a is tightened toward the cell stacked body 10. Namely, the outside pressing part 110 and the inside pressing part 115 press the first insulating plate 30a through the first tightening plate 41a.

On the other hand, the beam part 120 is a portion that does not come into contact with the first tightening plate 41a. As shown in FIGS. 6 and 7, the beam portion 120 has a U-shaped section in a thickness direction. The U-shaped beam part 120 forms a recess 120A by its inner surface. The recess 120 is recessed toward a side opposite to the cell stacked body 10. Thus, the beam part 120 does not come into contact with the first tightening plate 41a, when the second tightening plate 42b is tightened toward the cell stacked body 10.

The outside pressing part 110 and the inside pressing part 115 are described in more detail. In this embodiment, as shown in FIG. 6, when the second tightening plate 42a is apart from the cell stacked body 10, the inside pressing part 115 projects more than the outside pressing part 110 in the thickness direction (stacking direction St).

FIG. 6 shows a projecting amount Δt of the inside pressing part 115 in a exaggerated manner. The projecting amount Δt may be between 25% or more and 40% or less, in particular, between 30% or more and 35% or less, of the thickness of the second tightening plate 42b. More specifically, when the second tightening plate 42b formed of high tensile steel has a thickness of 2 mm, the projecting amount Δt may be between 0.6 mm or more and 0.7 mm or less.

On the other hand, as shown in FIG. 7, in a state where the second tightening plate 42a is tightened toward the cell stacked body 10, both the inside pressing part 115 and the outside pressing part 110 are coplanarly in contact with the first tightening plate 41a. In the second tightening plate 42a, the fastening parts 424A, 424B, 424C, and 424D are positioned on the outer peripheral side of the outside pressing part 110. The second tightening plate 42a is tightened toward the cell stacked body 10 by a force applied from the fastening parts 424A, 424B, 424C, and 424D in the stacking direction St.

When tightened as above, the inside pressing part 115 of the second tightening plate 42a, which is positioned closer to the center than the outside pressing part 110, is likely to float in a direction opposite to the cell stacked body 10. Here, as described above, in a state where the second tightening plate 42a is apart from the cell stacked body 10, the inside pressing part 115 projects more than the outside pressing part 110. In this case, the inside pressing part 115 and the second pressing part 110 can be brought into contact with the first tightening plate 41a, when the second tightening plate 42a is tightened toward the cell stacked body 10. Thus, a pressing force from the second tightening plate 42a can be uniformly applied to the first tightening plate 41a, thereby avoid partial stress concentration. A desirable value of the projecting amount Δt of the inside pressing part 115 projecting from the outside pressing part 110 varies depending on a thickness and/or a material of the second tightening plate 42b.

The outside pressing part 110 is formed to be along the four sides of the substantially rectangular plate body 420, and includes a first side 110A, a second side 110B, a third side 110C, and a fourth side 110D, as shown in FIG. 2. The inside pressing part 115 is positioned to be surrounded by the first side 110A, the second side 110B, the third side 110C, and the fourth side 110D. The inside pressing part 115 includes the center of the plate body 420, and has a similar shape to that of the plate body 420.

The beam part 120 is a portion having a U-shaped section in the thickness direction, as described above. In more detail, the beam part 120 includes a first beam element 124A, a second beam element 124B, a third beam element 124C, and a fourth beam element 124D which continuously form the four sides of the substantially rectangular shape on the inner peripheral side of the outside pressing part 110. The first beam element 124A, the second beam element 124B, the third beam element 124C, and the fourth beam element 124D each have a U-shaped section in the thickness direction orthogonal to the longitudinal direction. The first beam element 124A, the second beam element 124B, the third beam element 124C, and the fourth beam element 124D are located point symmetrically with respect to the center position of the inside pressing part 115.

In this embodiment, the beam part 120 and the fastening parts 424A, 424B, 424C and 424D are connected to each other. In more detail, at the juncture between the first beam element 124A having a U-shaped section and the second beam element 124B having a U-shaped section, an inner wall of the first beam element 124A, which faces the inside pressing part 115, and an inner wall of the second beam element 124B, which faces the inside pressing part 115, are joined to each other. On the other hand, outer walls of the respective first beam element 124A and the second beam element 124B extend along diagonal lines of the plate body 420 toward the corners of the plate body 420 so as not to be joined to each other, Upper ends of the outer walls of the first beam element 124A and the second beam element 124B, which extend along the diagonal lines of the plate body 420, are connected to each other to form a U-shaped section. The fastening part 424A is connected to ends of the outer walls of the first beam element 124A and the second beam element 124B facing extension directions of the diagonal lines of the plate body 420. The fastening part 424A has a U-shaped section, and this U-shaped section and the U-shaped section formed by the outer wall of the first beam element 124A and the outer wall of the second beam element 124B, are continuously connected to each other.

The fastening part 424B is connected to the juncture between the second beam element 124B and the third beam element 124C similarly to the aforementioned connection manner. The fastening part 424C is connected to the juncture between the third beam element 124C and the fourth beam element 124D. The fastening part 424D is connected to the juncture between the fourth beam element 124D and the first beam element 124A.

As described above, since the beam part 120 is connected to the fastening part 424A, 424B, 424C, 424D, the beam element continues smoothly between the adjacent fastening parts. A central height of each beam element 124A, 124B, 124C, 124D may be smaller than height of portions of the corresponding beam element adjacent to the fastening part 424A, 424B, 424C, 424D. Specifically in this embodiment, the height of each beam element 124A, 124B, 124C, 124D gradually decreases centrally from both ends thereof.

In this embodiment, the second tightening plate 42 is a press molded product. In this case, the aforementioned shape of each beam element 124A, 124B, 124C, 124D can suppress a situation where the central thickness of each beam element 124A, 124B, 124C, 124D is reduced. Suppose that the height of each beam element 124A, 1243, 124C, 124D is the same over the entire length in the longitudinal direction. In this case, as shown in FIG. 2, since the four beam elements 124A, 124B, 124C, and 124D are closer to each other at center side in the longitudinal direction, the central thickness size is likely to be reduced as compared with thickness size of the portions adjacent to the fastening part. Because of the reduced thickness size, cracks are likely to occur, and a surface pressure pressing the cell stacked body 10 is likely to be non-uniform. On the other hand, in this embodiment, since the height of the central portion of each beam element 124A, 124B, 124C, 124D is lower than the portions adjacent to the fastening part, the central thickness size is not reduced, whereby cracks are difficult to occur, and a surface pressure pressing the cell stacked body 10 can be made uniform. In addition, an amount of material used for each beam element 124A, 124B, 124C, 124D can be reduced as a whole, which results in light weight.

The part formed by the fastening parts adjacent each other and the beam element positioned therebetween may be formed to have a height which continuously varies from one fastening part to the other fastening part.

Each of the fastening parts 424A, 424B, 424C, and 424D includes, on an edge facing the cell stacked body 10, a flange 126A, 126B, 126C, 126D which is coplanar with the outside pressing part 110. The flanges 126A, 126B, 126C, and 126D can increase a contact surface area between the first tightening plate 41a and the second tightening plate 42a. The through holes 424A1, 424B, 424C1, and 424D1 are provided in an upper surface (surface opposite to the cell stacked body 10) on a distal portion side of the fastening parts 424A, 424B, 424C, and 424D.

The second tightening plate 42a is made of high tensile steel (having tensile strength of 400 MPa) as a base metal, and is formed integrally molded from a single plate with a die through a plurality of pressure pressing steps. In this case, a plate thickness of the second tightening plate 42 is 2 mm or less. The plate thickness of the second tightening plate 42a is not specifically limited, but an excessively thick or thin metal plate is undesirable from the viewpoint of processability. From this viewpoint, the plate thickness of the second tightening plate 42a may be between 1.5 mm or more and 3 mm or less, or between 2 mm or more and 3 mm or less. The plate thickness may be measured by known means.

As described above, the second tightening plate 42a having a relatively small plate thickness is advantageous in light weight and processability, as described above. On the other hand, such a second tightening plate 42a has smaller rigidity. Specifically, flexural rigidity of the second tightening plate 42a is smaller than flexural rigidity of the first tightening plate 41a.

When the second tightening plate 42a has a small rigidity, its center portion is likely to float due to the deflection upon the tightening operation. Here, the second tightening plate 42a in this embodiment includes the convex shaped inside pressing part 115 at the center side which is separated from the outside pressing part 110 by the recess 120A. In addition, the inside pressing part 115 protrudes more than the outside pressing part 110 before the tightening operation. Thus, even when the second tightening plate 42a is deflected, the tightening plate 42a is brought into contact with the first tightening plate 41a over a wide area. Meanwhile, since the second tightening plate 42a is partially in contact with the first tightening plate 41a, a distributed surface pressure is transmitted from the second tightening plate 42a to the first tightening plate 41a. However, since the first tightening plate 41a has the flat plate-shaped planar portion 411 which is in surface contact with the first insulating plate 30a, a uniform surface pressure can be applied from the first tightening plate 41a to the cell stacked body 10.

Function/Effect

Next, a function/effect of the embodiment is described.

When assembling the fuel cell 1, the first collecting plate 20a is located on an end surface of the cell stacked body 10 on one side in the stacking direction St, and the second collecting plate 20b is located on an end surface of the cell stacked body 10 on the other side in the stacking direction St. Then, the first insulating plate 30a is located on the first collecting plate 20a in the stacking direction St, and the second insulating plate 30b is located on the second collecting plate 20b in the stacking direction St.

Then, the first tightening plate 41a and the second tightening plate 42a are located in this order on the first insulating plate 30a, and the first tightening plate 41b and the second tightening plate 42b are located in this order on the second insulating plate 30b. After that, the fastening members 50 are provided respectively between the fastening parts 424A, 424B, 424C, and 424D of the second tightening plate 42a and the fastening parts 424A, 424B, 424C, and 424D of the second tightening plate 42b. Then, the second tightening plate 42a and the second tightening plate 42b are tightened by the fastening parts 50 so as to come close to each other.

When the second tightening plate 42a and the second tightening plate 42b are tightened by the fastening parts 50, the second tightening plate 42a and the second tightening plate 42b are likely to be deflected so that their center portions are likely to float, for example. For this reason, the second tightening plate 42a, 42b includes the convex-shaped protruding inside pressing part 115 at the center side which is separated from the outside pressing part 110 by the recess 120A. In addition, the inside pressing part 115 protrudes more than the outside pressing part 110 before the tightening operation. Thus, even when the second tightening plate 42a, 42b is deflected, the second tightening plate 42a, 42b is brought into contact with the first tightening plate 41a over a wide area.

On the other hand, since the second tightening plate 42a, 42b is partially in contact with the first tightening plate 41a at the outside pressing part 110 and the inside pressing part 115, a distributed surface pressure is transmitted from the second tightening plate 42a, 42b to the first tightening plate 41a, 41b. However, since the first tightening plate 41a, 41b has the flat plate-shaped planar portion 411 which is in surface contact with the first insulating plate 30a. Thereby, a uniform surface pressure can be applied from the first tightening plate 41a to the cell stacked body 10. Namely, the insulting plates 30, the collecting plates 20 and the cell stacked body 10 can be prevented from being damaged by stress concentration caused by a tightening force.

The aforementioned fuel cell 1 according to the embodiment comprises: the cell stacked body 10 including a plurality of single unit fuel cells 10c stacked one on another; the collecting plate 20 located on the cell stacked body 10; the insulating plate 30 located on the collecting plate 20; and the tightening structure 40 located on the insulating plate 30 and configured to hold the collecting plate 20 and the insulating plate 30 on the cell stacked body 10 by tightened. The tightening structure 40 includes a first tightening plate 41 including a planar portion 411 in surface contact with the insulating plate 30, and a second tightening plate 42 located on the first tightening plate 41 and configured to press the first tightening plate 41 against the insulating plate 30 by being tightened toward the cell stacked body 10. Thus, even when the tightening plate (in more detail, the second tightening plate 42) is deflected, a uniform surface pressure can be applied from the second tightening plate 42 to the cell stacked body 10. The uniform surface pressure can suppress contact resistance, which can improve performance of the fuel cell 1.

Since the plate-shaped first tightening plate 41 can ensure the rigidity of the tightening structure 40, the second tightening plate 42 can be reduced in plate thickness, thereby reducing a weight. Further, due to integral molding a reduced plate thickness of the second tightening plate 42 makes processing easy, and reducing the cost of press molding, Since the second tightening plate 42 is easy to be deflected because of its reduced thickness or the like, expansion and contraction during the tightening operation can be absorbed, which can suppress damage of the single unit fuel cell 10c and also can suppress decrease in tightening force.

In this embodiment, the second tightening plate 42 includes fastening parts 424A, 424B, 424C, and 424D protruding to an outer peripheral side from the first tightening plate 41 when seen in a stacking direction St. The second tightening plate 42 is tightened toward the cell stacked body 10 by a force applied from the fastening parts 424A, 424B, 424C, and 424D in the stacking direction St. The first tightening plate 41 includes cutouts 412A, 412B, 412C, and 412D extending in a direction opposite to the protruding direction of the fastening parts 424A, 424B, 424C, and 424D. In more detail, the cutouts 412A, 412B, 412C, and 412D are provided at four corners of the first tightening plate 41. In this case, when the fastening parts 424A, 424B, 424C, and 424D are deflected to the cell stacked body 10 during the tightening operation of the second tightening plate 42, it is possible to prevent the largely deflected portions of the fastening parts 424A, 424B, 424C, and 424D and their flanges 126A, 126B, 126C and 126D, from contacting the first tightening plate 41. This can avoid partial stress concentration at the first tightening plate 41, whereby a more uniform surface pressure can be applied from the second tightening plate 42 to the cell stacked body 10.

Note that a fuel cell in which two tightening plates sandwich a cell stacked body has already existed. The aforementioned tightening plate 41 in this embodiment may be additionally provided on such an existing fuel cell. This can adjust a tightening force of the existing fuel cell.

Namely, in this case, a step of detaching the tightening plate is performed.

Then, a step of providing, on the insulating plate, an additional tightening plate (corresponding to the first tightening plate 41) including a planar portion to be in surface contact with the insulting plate is performed.

Then, a step of holding the collecting plate and the insulating plate on the cell stacked body by locating the aforementioned tightening plate on the additional tightening plate, and by tightening the tightening plate toward the cell stacked body to press the additional tightening plate against the insulating plate is performed.

While one embodiment and its modification example have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and theft equivalents are intended to cover such forms or modifications as would fail within the scope and spirit of the invention.

For example, the fuel cell 1 has been described in the above embodiment. However, as another embodiment, the aforementioned tightening structure 40 may be applied to an electrochemical device (electrolyzer) which functions as a hydrogen production device or the like. In this case, the electrochemical device comprises: a cell stacked body including a plurality of electrochemical cells stacked one on another; a collecting plate located on the cell staked body in a stacking direction of the electrochemical cells; an insulating plate located on the collecting plate; and a tightening structure located on the insulating plate and configured to hold the collecting plate and the insulating plate on the cell stacked body by tightened. The tightening structure includes a first tightening plate including a planar portion in surface contact with the insulating plate, and a second tightening plate located on the first tightening plate and configured to press the first tightening plate against the insulating plate when being tightened toward the cell stacked body.

The position of the manifold is not limited to the aforementioned embodiment. For example, a structure including a manifold including an inlet and an outlet, and an opposed manifold opposed to the manifold via a cell stacked body may be employed. In this case, a gas coming from the inlet flows through the cell stacked body into the opposed manifold, and turns there to flow through the cell stacked body toward the outlet.

What is claimed is:

1. A fuel cell comprising:
a cell stacked body including a plurality of single unit fuel cells stacked one on another;
a collecting plate located on the cell stacked body in a stacking direction of the single unit fuel cells;
an insulating plate located on the collecting plate; and
a tightening structure located on the insulating plate and configured to hold the collecting plate and the insulating plate on the cell stacked body by being tightened toward the cell stacked body,
wherein the tightening structure includes a first tightening plate including a planar portion in surface contact with the insulating plate, and a second tightening plate located on the first tightening plate and configured to press the first tightening plate against the insulating plate by being tightened toward the cell stacked body.

2. The fuel cell according to claim 1, wherein flexural rigidity of the first tightening plate is larger than flexural rigidity of the second tightening plate.

3. The fuel cell according to claim 1, wherein:
the second tightening plate includes an outside pressing part formed along an outer periphery of the second tightening plate, and an inside tightening plate provided closer to a center of the second tightening plate than the outside pressing part;
the outside pressing part and the inside pressing part are respectively in contact with the first tightening plate; and
a recess is provided between the outside pressing part and the inside pressing part, the recess being recessed toward a side opposite to the cell stacked body.

4. The fuel cell according to claim 3, wherein the second tightening plate is configured such that, when the second tightening plate is apart from the cell stacked body, the inside pressing part projects more than the outside pressing part in a thickness direction.

5. The fuel cell according to claim 3, wherein:
The second tightening plate includes a connection connecting the outside pressing part to the inside pressing part; and
the connection has a U-shaped section in a thickness direction, the recess being formed by an inner surface of the U-shaped connection.

6. The fuel cell according to claim 3, wherein the second tightening plate includes a fastening part on an outer peripheral side of the outside pressing part, and the second is configured to be tightening plate being tightened toward the cell stacked body by a force applied from the fastening part in the stacking direction.

7. The fuel cell according to claim 1, wherein:
the second fastening plate includes a fastening part protruding to an outer peripheral side from the first tightening plate when seen in the stacking direction, and the second tightening plate is configured to be tightened toward the cell stacked body by a force applied from the fastening part in the stacking direction; and
the first tightening plate is provided with a cutout extending in a direction opposite to a protruding direction of the fastening part.

8. The fuel cell according to claim 7, wherein
the first tightening plate has a rectangular shape;
the fastening parts protrude from four corners of the first tightening plate; and
the cutouts are provided at the four corners.

9. The fuel cell according to claim 1, wherein
the second tightening plate is a press molded product.

10. The fuel cell according to claim 1, wherein
a thickness of the second tightening plate is 3 mm or less.

11. An electrochemical device comprising:
a cell stacked body including a plurality of electrochemical cells stacked one on another;
a collecting plate located on the cell stacked body in a stacking direction of the electrochemical cells;
an insulating plate located on the collecting plate; and
a tightening structure located on the insulating plate and configured to hold the collecting plate and the insulating plate on the cell stacked body by being tightened toward the cell stacked body,
wherein the tightening structure includes a first tightening plate including a planar portion in surface contact with the insulating plate, and a second tightening plate located on the first tightening plate and configured to press the first tightening plate against the insulating plate by being tightened toward the cell stacked body.

12. A method of tightening and adjusting a fuel cell comprising a cell stacked body including a plurality of single unit fuel cells stacked one on another, a collecting plate located on the cell stacked body in a stacking direction of the single unit fuel cells; an insulating plate located on the collecting plate; and a tightening structure located on the insulating plate and configured to hold the collecting plate and the insulating plate on the cell stacked body by being tightened toward the cell stacked body, the method comprising:
a step of detaching the tightening plate;
a step of providing, on the insulating plate, an additional tightening plate including a planar portion to be in surface contact with the insulting plate; and
a step of holding the collecting plate and the insulating plate on the cell stacked body by locating the tightening plate on the additional tightening plate, and by tightening the tightening plate toward the cell stacked body to press the additional tightening plate against the insulating plate.

* * * * *